(12) United States Patent
Chien et al.

(10) Patent No.: US 6,316,516 B1
(45) Date of Patent: Nov. 13, 2001

(54) COATING COMPOSITION FOR OPTICAL FIBERS

(75) Inventors: Ching Kee Chien; Edward J. Fewkes, both of Horseheads; Eric H. Urruti; Michael J. Winningham, both of Big Flats, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/301,814

(22) Filed: Apr. 29, 1999

(51) Int. Cl.⁷ ................................................. C08F 2/48
(52) U.S. Cl. ........................ 522/91; 522/77; 522/96; 522/148; 522/97; 522/95; 522/93; 522/92; 522/104; 522/108; 522/100; 522/142; 522/144; 522/135; 522/182; 428/378; 427/515; 427/518
(58) Field of Search ...................... 522/77, 91, 96, 522/83, 82, 148, 97, 95, 93, 92, 104, 108, 100, 182, 135, 142, 144; 524/261, 265, 266; 428/378, 380, 383, 391, 394; 427/515, 520

(56) References Cited

U.S. PATENT DOCUMENTS

| | | | |
|---|---|---|---|
| Re. 33,677 | 8/1991 | Vazirani | 385/123 |
| 3,919,150 * | 11/1975 | Kiel et al. | 260/28.5 R |
| 4,569,566 | 2/1986 | Triner | 339/99 |
| 4,609,718 | 9/1986 | Bishop et al. | 528/49 |
| 4,629,287 | 12/1986 | Bishop | 350/96.34 |
| 4,647,682 | 3/1987 | Panster et al. | 556/431 |
| 4,690,502 | 9/1987 | Zimmerman et al. | 350/96.29 |
| 4,798,852 | 1/1989 | Zimmerman et al. | 522/96 |
| 4,849,462 | 7/1989 | Bishop | 522/97 |
| 4,875,759 | 10/1989 | Ogawa | 350/96.34 |
| 4,889,901 | 12/1989 | Shama et al. | 526/279 |
| 4,921,880 * | 5/1990 | Lee et al. | 522/12 |
| 5,018,829 | 5/1991 | Ogawa | 350/96.34 |
| 5,109,442 | 4/1992 | Klainer et al. | 385/12 |
| 5,128,391 | 7/1992 | Shustack | 522/92 |
| 5,146,531 | 9/1992 | Shustack | 385/128 |
| 5,188,864 * | 2/1993 | Lee et al. | 427/515 |
| 5,199,098 | 3/1993 | Nolan et al. | 385/128 |
| 5,219,896 | 6/1993 | Coady et al. | 522/96 |
| 5,262,362 | 11/1993 | Hrbacek | 501/12 |
| 5,286,527 | 2/1994 | Blum et al. | 427/407.1 |
| 5,336,563 | 8/1994 | Coady et al. | 428/375 |

(List continued on next page.)

FOREIGN PATENT DOCUMENTS 0 072 435   12/1985   (EP) .
97/46380    12/1997   (WO) .

OTHER PUBLICATIONS

A.E.E. Jokinen et al., "Treated Glass Fibres: Adsorption of an Isocyanurate Silane from Ethanol", Journal of Material Science Letters, vol. 17, 1998, pp. 149–152.

*Primary Examiner*—James J. Seidleck
*Assistant Examiner*—Sanza L. McClendon
(74) *Attorney, Agent, or Firm*—Robert L. Carlson; Timothy R. Krogh

(57) ABSTRACT

The present invention relates to a composition for coating optical fibers which contains an oligomer capable of being polymerized, a monomer suitable to control the viscosity of the composition, and an adhesion promoter which includes a compound containing a cyclic structure interposed between at least two reactive silanes which are independently an alkoxysilane or a halosilane. Another composition of the present invention includes an oligomer capable of being polymerized, a monomer suitable to control the viscosity of the composition, an adhesion promoter which includes a compound containing a reactive silane group, and a carrier. The present invention also relates to optical fibers and methods of making such optical fibers using the compositions of the present invention.

68 Claims, 1 Drawing Sheet

U.S. PATENT DOCUMENTS

| | | | |
|---|---|---|---|
| 5,352,712 | 10/1994 | Shustack | 522/31 |
| 5,384,342 | 1/1995 | Szum | 522/172 |
| 5,459,175 | 10/1995 | Woods et al. | 522/180 |
| 5,461,691 | 10/1995 | Schunck et al. | 385/123 |
| 5,514,727 | 5/1996 | Green et al. | 522/15 |
| 5,527,835 | 6/1996 | Shustack | 522/42 |
| 5,536,529 | 7/1996 | Shustack | 427/163.2 |
| 5,538,791 | 7/1996 | Shustack | 428/392 |
| 5,539,014 | 7/1996 | Swedo et al. | 522/91 |
| 5,549,929 * | 8/1996 | Scheilbelhoffer et al. | 427/282 |
| 5,587,403 | 12/1996 | Shustack | 522/42 |
| 5,595,820 | 1/1997 | Szum | 428/378 |
| 5,622,782 * | 4/1997 | Poutasse, III et al. | 428/344 |
| 5,664,041 * | 9/1997 | Szum | 385/128 |
| 5,750,197 * | 5/1998 | van Ooij et al. | 428/318 |
| 5,907,023 * | 5/1999 | Chawla | 528/49 |
| 6,020,408 * | 2/2000 | Suzuke et al. | 524/265 |

* cited by examiner

COATING COMPOSITION FOR OPTICAL FIBERS

FIELD OF THE INVENTION

The present relates to coating compositions for optical fibers, optical fibers prepared with such coatings, and a method of making optical fibers that contain such coatings.

BACKGROUND OF THE INVENTION

Optical fibers have acquired an increasingly important role in the field of communications, frequently replacing existing copper wires. This trend has had a significant impact in the local area networks (i.e., for fiber-to-home uses), which has seen a vast increase in the usage of optical fibers. Further increases in the use of optical fibers in local loop telephone and cable TV service are expected, as local fiber networks are established to deliver ever greater volumes of information in the form of data, audio, and video signals to residential and commercial users. In addition, use of optical fibers in home and commercial business for internal data, voice, and video communications has begun and is expected to increase.

The fibers used in local networks are directly exposed to harsh conditions, including severe temperature and humidity extremes. Since prior coatings did not perform well under such adverse conditions, the need existed for the development of higher performance coatings to address the wide and varied temperature and humidity conditions in which fibers are employed. Specifically, these coatings possessed thermal, oxidative, and hydrolytic stability which is sufficient to protect the encapsulated fiber over a long life-span (i.e., about twenty-five or more years).

Optical fibers typically contain a glass core and at least two coatings, i.e., a primary (or inner) coating and a secondary (or outer) coating. The primary coating is applied directly to the glass fiber and, when cured, forms a soft, elastic, and compliant material which encapsulates the glass fiber. The primary coating serves as a buffer to cushion and protect the glass fiber core when the fiber is bent, cabled, or spooled. Stresses placed upon the optical fiber during handling may induce microbending of the fibers and cause attenuation of the light, which is intended to pass through them, resulting in inefficient signal transmission. The secondary coating is applied over the primary coating and functions as a tough, protective outer layer that prevents damage to the glass fiber during processing and use.

Certain characteristics are desirable for the primary coating, and others for the secondary coating. The modulus of the primary coating must be sufficiently low to cushion and protect the fiber by readily relieving stresses on the fiber, which can induce microbending and consequent inefficient signal transmission. This cushioning effect must be maintained throughout the fiber's lifetime.

Because of differential thermal expansion properties between the primary and secondary coatings, the primary coating must also have a glass transition temperature ($T_g$) which is lower than the foreseeable lowest use temperature. This enables the primary coating to remain elastic throughout the temperature range of use, facilitating differences in the coefficient of thermal expansion between the glass fiber and the secondary coating.

It is important for the primary coating to have a refractive index which is different (i.e., higher) than the refractive index of the cladding. This permits a refractive index differential between the cladding and the primary coating that allows errant light signals to be refracted away from the glass core.

Finally, the primary coating must maintain adequate adhesion to the glass fiber during thermal and hydrolytic aging, yet be strippable therefrom for splicing purposes. Moisture resistance is essential, because moisture also affects the adhesion of the primary coating to the glass. Poor adhesion can result in microbending and/or various sized delaminations, which can be significant sources of attenuation in the optical fiber.

To provide adequate adhesion during thermal and hydrolytic aging, particularly in high temperature and high humidity applications, many primary coating compositions include adhesion promoters which facilitate adhesion, particularly in wet environments, of the primary coating to the glass fiber. A number of suitable adhesion promoters have been described in the art, including acid-functional materials and organofunctional silanes. Of these, organofunctional silanes are preferred, because such silanes are less corrosive and coatings incorporating such silanes tend to better maintain their adhesive properties. Suitable organofunctional silanes which have been described in the art include, generally, amino-functional silanes, mercapto-functional silanes, methacrylate-functional silanes, acrylamido-functional silanes, allyl-functional silanes, vinyl-functional silanes, and acrylate-functional silanes. Exemplary organofunctional silanes are disclosed in U.S. Pat. No. 5,146,531 to Shustack.

Despite the use of adhesion promoters in the art, the need remains for improved adhesion promoters and improved coating compositions for glass fibers. The present invention is directed to overcoming this deficiency in the art.

SUMMARY OF THE INVENTION

One aspect of the invention relates to a composition for coating optical fibers. A first composition of the invention includes an oligomer capable of being polymerized, a monomer suitable to control the viscosity of the composition, and an adhesion promoter having a compound containing a cyclic structure interposed between at least two reactive silanes, which are independently an alkoxysilane or a halosilane. A second composition of the invention includes an oligomer capable of being polymerized, a monomer suitable to control the viscosity of the composition, an adhesion promoter comprising a compound containing a reactive silane, and a carrier.

Another aspect of the invention relates to an optical fiber. A first optical fiber of the invention includes a glass fiber and a primary coating encapsulating the glass fiber. This primary coating is the cured product of a polymerizable composition that includes an adhesion promoter including a compound containing a cyclic structure interposed between at least two reactive silanes, which are independently an alkoxysilane or a halosilane. A second optical fiber of the invention also includes a glass fiber and a primary coating encapsulating the glass fiber. This primary coating is the cured product of a polymerizable composition that includes a carrier and an adhesion promoter including a compound containing a reactive silane.

Still another aspect of the invention relates to a method of making an optical fiber in accordance with the present invention. One method of the present invention includes providing a glass fiber, coating the glass fiber with a primary polymerizable composition that includes an adhesion promoter including a compound containing a cyclic structure interposed between at least two reactive silanes which are independently an alkoxysilane or a halosilane, and polymerizing the composition under conditions effective to form a primary coating over the glass fiber. Another method of the present invention includes providing a glass fiber, coating the glass fiber with a primary polymerizable composition that includes a carrier and an adhesion promoter including a compound containing a reactive silane, and polymerizing the composition under conditions effective to form a primary coating over the glass fiber.

By employing in a primary coating composition of the present invention having either (1) an adhesion promoter that includes a compound containing a cyclic structure interposed between at least two reactive silanes which are independently an alkoxysilane or a halosilane, or (2) a combination of a carrier and an adhesion promoter that includes a compound containing a reactive silane, it is possible to enhance the adhesive property of the primary coating on an optical fiber. As a result, the occurrence of delaminations can be reduced or eliminated. Further, the useful life of optical fibers can be enhanced and the quality of signal transmission (i.e., minimal attenuation) over the lifetime of the optical fiber can be maintained.

DETAILED DESCRIPTION OF THE INVENTION

Figure 1:
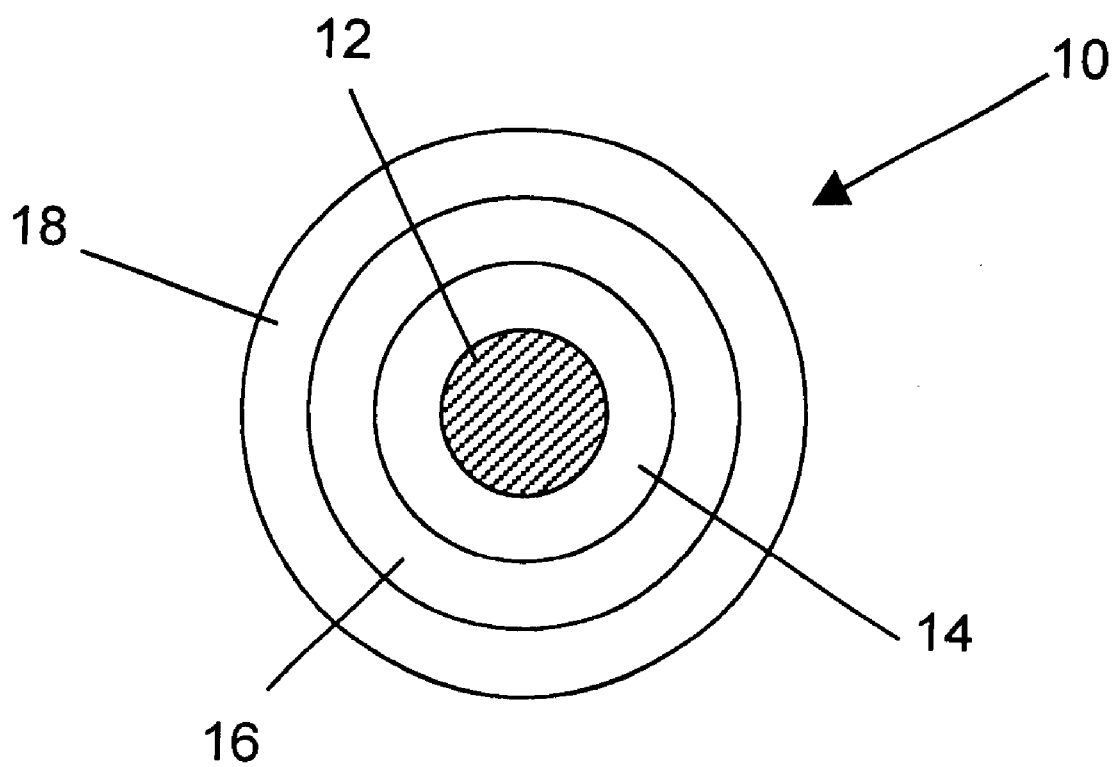
FIG. 1 is a cross-sectional view of an optical fiber of the present invention.

One aspect of the present invention relates to a composition for coating optical fibers. The composition includes an oligomer capable of being polymerized, a monomer suitable to control the viscosity of the composition, and an adhesion promoter comprising a compound containing a cyclic structure interposed between at least two reactive silanes which are independently an alkoxysilane or a halosilane.

The cyclic structure can be a hydrocarbon cyclic structure or a heterocyclic structure or a combination thereof. Hydrocarbon cyclic structures and heterocyclic structures can be single-ring, fused-ring, or multi-ring structures, with or without hydrocarbon or hetero-substituents. Suitable hydrocarbon cyclic structures include, but are not limited to, cycloalkanes, preferably containing between 3 to 10, more preferably 5 to 6 carbon atoms per cyclic structure; cycloalkenes, preferably containing between 3 to 10, more preferably 5 to 6 carbon atoms per cyclic structure; cycloalkyldienes, preferably containing between 3 to 10, more preferably 5 to 6 carbon atoms per cyclic structure; substituted aliphatic rings; aromatic rings; and substituted aromatic rings. Preferably the hydrocarbon cyclic structure is an aromatic ring or a substituted aromatic ring. Exemplary hydrocarbon cyclic structures include, but are not limited to, benzene, naphthalene, cyclohexane, cyclohexene, etc. Suitable heterocyclic structure include those which contain oxygen, nitrogen, sulfur, or phosphorous hetero atom(s) within the ring structure. Exemplary heterocyclic structures include, but are not limited to, pyridines, pyrroles, imidazoles, indoles, pyrimidines, pyrrolidines, piperidines, furans, thiophenes, etc.

The at least two reactive silanes can independently be an alkoxysilane, a dialkoxysilane, a trialkoxysilane, a halosilane, a dihalosilane, or a trihalosilane. Preferably, the at least two reactive silanes are independently dialkoxysilanes, trialkoxysilanes, or trihalosilanes. Suitable alkoxysilanes, dialkoxysilanes, and trialkoxysilanes include alkoxy groups independently having between 1 and 6 carbon atoms. A preferred halosilane is a chlorosilane, more preferably a trichlorosilane.

The compound can also include a substituent interposed between the cyclic structure and one (or more) of the at least two alkoxysilanes. Suitable substituents include straight-chain alkylene groups having between 1 and 12 carbon atoms; branched-chain alkylene groups having between 1 and 12 carbon atoms; straight and branched-chain alkylene groups having a heterogroup; and a heterogroup including, but not limited to, oxygen, nitrogen, sulfur, phosphorous, selenium, titanium, zirconium, and silicon.

Organofunctional silanes can be synthesized by a variety of methods, some of which are disclosed in Plueddemann, *Silane Coupling Agents* $2^{nd}$ Edition (Chapter 2), Plenum Press, New York (1991), Arkles, *Chemtech,* 7:766–778 (1977), Plueddemann, in *Silylated Surfaces* (Chapter 2), Leyden and Collins, Eds., Midland Macromolecular Monographs, Volume 7, Gordon and Breach Science Publishers, New York (1978), and Barton et al., in *Silicon-Based Polymer Science: A Comprehensive Resource* (Chapter 1), Zeigler and Gordon Fearon, Eds., Advances in Chemistry 224, American Chemical Society, Washington, DC, (1989), which are hereby incorporated by reference. Any other known synthesis schemes can also be utilized to prepare an adhesion promoter utilized in the compositions of the present invention.

One of the most common methods of making an organofunctional silane is via hydrosilation of an olefin. As shown in the reaction scheme below, hydrosilation involves the addition of a trifunctional silane (e.g., trichlorosilane) across an alkene double bond in the presence of a catalyst such as chloroplatinic acid, $H_2PtCl_6$, to yield an organofunctional trichlorosilane. Subsequent treatment of an organofunctional trichlorosilane with the appropriate alcohol yields an organofunctional trialkoxysilane. Thus, subsequent conversion of the trichlorosilane to a trimethoxysilane is accomplished with methanol and a suitable trans-esterification catalyst.

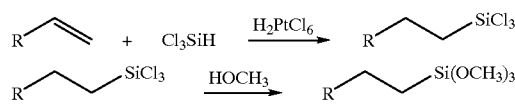

According to another approach, reaction of an organometallic species or a common Grignard reagent with $SiCl_4$ yields organofunctional trichlorosilanes as shown in the reaction scheme below. The organometallic reactant could be aliphatic or aromatic and may contain a variety of attached functional groups. Again, subsequent treatment of an organofunctional trichlorosilane with the appropriate alcohol yields an organofunctional trialkoxysilane.

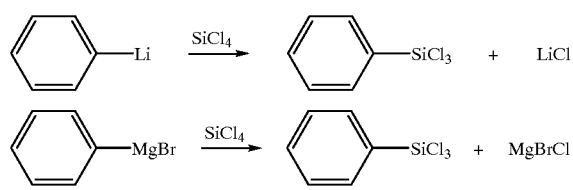

Still another method of forming organofunctional silanes is via a radical approach. Trichlorosilyl radicals can be formed from trichlorosilane in the presence of a radical forming species, such as an organoperoxide. This method is shown in the reaction scheme set forth below, where phenyltrichlorosilane is prepared from benzene and trichlorosilane. The trichlorosilyl radical can react with various species via, presumably, a radical combination reaction mechanism.

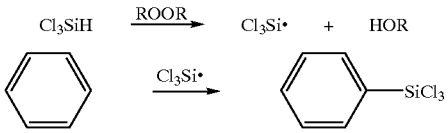

A direct route toward synthesis of organosilanes is shown below. For example, treatment of 1-chloro-2-propene with HCl and silicon in the presence of copper metal produces a variety of products, including organofunctional dichlorosilanes and organofunctional trichlorosilanes.

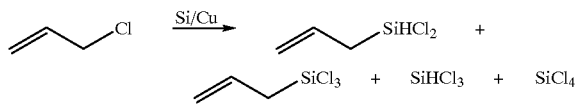

Still another approach involves coupling of unsaturated silanes to aromatic compounds, which can be accomplished via Freidel-Crafts alkylation as shown in the reaction scheme set forth below. For example, allyldichlorosilane couples to benzene with a strong Lewis acid catalyst, such as aluminum chloride.

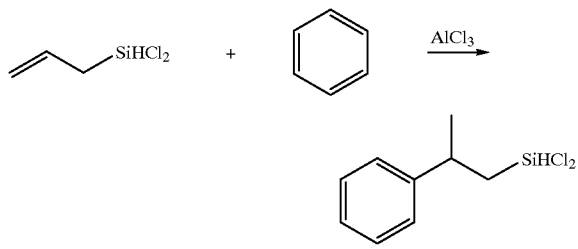

Preferred compounds include bis(trimethoxysilylethyl) benzene and bis(triethoxysilylethyl)benzene. Bis (trimethoxysilylethyl)benzene is commercially available from Gelest (Tellytown, Pa.) and United Chemical Technologies, Inc. (Bristol, Pa.). Bis(triethoxysilylethyl) benzene can be synthesized from bis(trimethoxysilylethyl) benzene by trans-esterification with ethanol.

As used herein, the weight percent of a particular component refers to the amount introduced into the bulk composition excluding the adhesion promoter and other additives. The amount of adhesion promoter and various other additives that are introduced into the bulk composition to produce a composition of the present invention is listed in parts per hundred. For example, an oligomer, monomer, and photoinitiator are combined to form the bulk composition such that the total weight percent of these components equals 100 percent. To this bulk composition, an amount of adhesion promoter, for example 1.0 part per hundred, is introduced in excess of the 100 weight percent of the bulk composition.

Preferably the adhesion promoter is present in an amount between about 0.1 to about 10 parts per hundred, more preferably between about 0.25 to about 4 parts per hundred, most preferably between about 0.5 to about 3 parts per hundred.

A major component of the coating composition of the present invention is the oligomer. Preferably the oligomer is an ethylenically unsaturated oligomer, more preferably a (meth)acrylate oligomer. By (meth)acrylate, we mean acrylate or methacrylate. The (meth)acrylate terminal groups in such oligomers may be provided by a monohydric poly (meth)acrylate capping component, or by a mono(meth) acrylate capping component such as 2-hydroxyethyl acrylate, in the known manner.

Urethane oligomers are conventionally provided by reacting an aliphatic or aromatic diisocyanate with a dihydric polyether or polyester, most typically a polyoxyalkylene glycol such as a polyethylene glycol. Such oligomers typically have 4–10 urethane groups and may be of high molecular weight, e.g., 2000–8000. However, lower molecular weight oligomers, having molecular weights in the 500–2000 range, may also be used. U.S. Pat. Nos. 4,608,409 to Coady et al. and 4,609,718 to Bishop et al., which are hereby incorporated by reference, describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from 2–250 carbon atoms and, preferably, are substantially free of ether or ester groups. The ranges of oligomer viscosity and molecular weight obtainable in these systems are similar to those obtainable in unsaturated, polar oligomer systems, such that the viscosity and coating characteristics thereof can be kept substantially unchanged. The reduced oxygen content of these coatings has been found not to unacceptably degrade the adherence characteristics of the coatings to the surfaces of the glass fibers being coated.

As is well known, polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently non-polar and saturated as to avoid compromising the moisture resistance of the system.

Thus, it is desirable for the coating composition of the present invention to contain at least one ethylenically unsaturated oligomer, although more than one oligomer component can be introduced into the composition. Preferably, the oligomer(s) is present in an amount between about 10 to about 90 percent by weight, more preferably between about 35 to about 75 percent by weight, and most preferably between about 40 to about 65 percent by weight.

Suitable ethylenically unsaturated oligomers include polyether urethane acrylate oligomers (e.g., CN986 available from Sartomer Company, Inc., (West Chester, Pa.)) and BR3731 and STC3-149 available from Bomar Specialty Co. (Winstead, Conn.)), acrylate oligomers based on tris (hydroxyethyl)isocyanurate, (meth)acrylated acrylic oligomers, polyester urethane acrylate oligomers (e.g., CN966 and CN973 available from Sartomer Company, Inc. and BR7432 available from Bomar Specialty Co.), polyurea urethane acrylate oligomers (e.g., oligomers disclosed in U.S. Pat. Nos. 4,690,502 and 4,798,852 to Zimmerman et al., 4,609,718 to Bishop, and 4,629,287 to Bishop et al., all of which are hereby incorporated by reference), polyether acrylate oligomers (e.g., Genomer 3456 available from Rahn AG (Zurich, Switzerland), polyester acrylate oligomers (e.g., Ebecryl 80, 584, and 657 available from UCB Radcure (Atlanta, Ga.)), polyurea acrylate oligomers (e.g., oligomers disclosed in U.S. Pat. Nos. 4,690,502 and 4,798,852 to Zimmerman et al., 4,609,718 to Bishop, and 4,629,287 to Bishop et al., all of which are hereby incorporated by reference), epoxy acrylate oligomers (e.g., CN120 available from Sartomer Company, Inc., and Ebecryl 3201 and 3604 available from UCB Radcure), hydrogenated polybutadiene oligomers (e.g., Echo Resin MBNX available from Echo Resins and Laboratory (Versailles, Mo.)), and combinations thereof.

The coating compositions of the invention will typically also comprise, in addition to the oligomer component, a monomer component. Preferably, the monomer is an ethylenically unsaturated monomer, more preferably a (meth)acrylate monomer. Generally, suitable monomers are those for which the resulting homopolymer would have a glass transition temperature ($T_g$) of at most about 20° C., preferably at most about 10° C. Generally, a lower molecular weight (i.e., about 120 to 600) liquid (meth)acrylate-functional monomer is added to the formulation to provide the liquidity needed to apply the coating composition with conventional liquid coating equipment. Typical acrylate-functional liquids in these systems include monofunctional and polyfunctional acrylates (i.e., monomers having two or more acrylate functional groups). Illustrative of these polyfunctional acrylates are the difunctional acrylates, which have two functional groups; the trifunctional acrylates, which have three functional groups; and the tetrafunctional acrylates, which have four functional groups. Monofunctional and polyfunctional methacrylates may also be employed.

When it is desirable to utilize moisture-resistant components, the monomer component will be selected on the basis of its compatibility with the selected moisture-resistance oligomer. Not all such liquid monomers may be successfully blended and co-polymerized with the moisture-resistant oligomers, because such oligomers are highly non-polar. For satisfactory coating compatibility and moisture resistance, it is desirable to use a liquid acrylate monomer component comprising a predominantly saturated aliphatic mono- or di-acrylate monomer or alkoxy acrylate monomers.

Thus, it is desirable for the composition to contain at least one ethylenically unsaturated monomer, although more than one monomer can be introduced into the composition. Preferably, the ethylenically unsaturated monomer is present in an amount between about 10 to about 90 percent by weight, more preferably between about 20 to about 60 percent by weight, and most preferably between about 25 to about 45 percent by weight.

Suitable ethylenically unsaturated monomers include lauryl acrylate (e.g., SR335 available from Sartomer Company, Inc., Ageflex FA12 available from CPS Chemical Co. (Old Bridge, N.J.), and Photomer 4812 available from Henkel (Ambler, Pa.)), ethoxylatednonylphenol acrylate (e.g., SR504 available from Sartomer Company, Inc. and Photomer 4003 available from Henkel), caprolactone acrylate (e.g., SR495 available from Sartomer Company, Inc., and Tone M100 available from Union Carbide Company (Danbury, Conn.)), phenoxyethyl acrylate (e.g., SR339 available from Sartomer Company, Inc., Ageflex PEA available from CPS Chemical Co., and Photomer 4035 available from Henkel), isooctyl acrylate (e.g., SR440 available from Sartomer Company, Inc. and Ageflex FA8 available from CPS Chemical Co.), tridecyl acrylate (e.g., SR489 available from Sartomer Company, Inc.), phenoxyglycidyl acrylate (e.g., CN131 available from Sartomer Company, Inc.), lauryloxyglycidyl acrylate (e.g., CN130 available from Sartomer Company, Inc.), isobornyl acrylate (e.g., SR506 available from Sartomer Company, Inc. and Ageflex IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and Ageflex FA10 available from CPS Chemical Co.), 2-(2-ethoxyetboxy)ethyl acrylate (e.g., SR256 available from Sartomer Company, Inc.), and combinations thereof.

As is well known, optical fiber coating compositions may also contain a polymerization initiator which is suitable to cause polymerization (i.e., curing) of the composition after its application to a glass fiber. Polymerization initiators suitable for use in the primary coating compositions of the present invention include thermal initiators, chemical initiators, electron beam initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes between about 0.5 to about 10.0 percent by weight, more preferably between about 1.5 to about 7.5 percent by weight.

The photoinitiator, when used in a small but effective amount to promote radiation cure, must provide reasonable cure speed without causing premature gelation of the coating composition. A desirable cure speed is any speed sufficient to cause substantial curing of the coating materials. As measured in a dose versus modulus curve, a cure speed for coating thicknesses of about 25–35 "m is, e.g., less than 1.0 $J/cm^2$, preferably less than 0.5 $J/cm^2$.

Suitable photoinitiators include 1-hydroxycyclohexylphenyl ketone (e.g., Irgacure 184 available from Ciba Specialty Chemical (Hawthorne, N.Y.), (2,6-dimethoxybenzoyl)-2,4,4-trimethylpentyl phosphine oxide (e.g., commercial blends Irgacure 1800, 1850, and 1700 available from Ciba Specialty Chemical), 2,2-dimethoxyl-2-phenyl acetophenone (e.g., Irgacure 651, available from Ciba Specialty Chemical), and combinations thereof.

In addition to the above-described components, the primary coating composition of the present invention can optionally include any number of additives, such as reactive diluents, antioxidants, catalysts, lubricants, co-monomers, low molecular weight non-crosslinking resins, and stabilizers. Some additives (e.g. chain transfer agents, for example) can operate to control the polymerization process, thereby affecting the physical properties (e.g., modulus, glass transition temperature) of the polymerization product formed from the primary coating composition. Others can affect the integrity of the polymerization product of the primary coating composition (e.g., protect against de-polymerization or oxidative degradation).

A preferred catalyst is a tin-catalyst, which is used to catalyze the formation of urethane bonds in some oligomer components. Whether the catalyst remains as an additive of the oligomer component or additional quantities of the catalyst are introduced into the composition of the present invention, the presence of the catalyst can act to stabilize the oligomer component in the composition.

A preferred antioxidant is thiodiethylene bis(3,5-di-tert-butyl)-4-hydroxyhydrocinnamate (e.g., Irganox 1035, available from Ciba Specialty Chemical).

A preferred co-monomer is the polar monomer N-vinyl-pyrrolidone available from International Specialty Products (Wayne, N.J.).

Another aspect of the present invention relates to a composition that contains an oligomer capable of being polymerized, a monomer suitable to control the viscosity of the composition, an adhesion promoter that includes a compound containing a reactive silane, and a carrier.

The carrier is preferably a carrier which functions as a reactive surfactant. Reactive surfactants which are partially soluble or insoluble in the composition are particularly preferred. Without being bound to a particular theory, it is believed that carriers which function as reactive surfactants interact with the compound containing a reactive silane by depositing such compounds on the glass fiber, where it is allowed to react. It is desirable for the carrier to be present in an amount between about 0.01 to about 5 parts per hundred, more preferably about 0.25 to about 3 parts per hundred.

Suitable carriers, more specifically carriers which function as reactive surfactants, include polyalkoxypolysiloxanes. A preferred carrier is available from Goldschmidt Chemical Co. (Hopewell, Va.) under the tradename Tegorad 2200.

Although the adhesion promoter can be any adhesion promoter that includes a compound with a reactive silane, preferably it is an adhesion promoter as described above (i.e., including a compound containing a cyclic structure interposed between at least two reactive silanes, which are independently alkoxysilanes or halosilanes). Other suitable adhesion promoters are described in U.S. Pat. Nos. 4,921,880 and 5,188,864 to Lee et al., which are hereby incorporated by reference.

The oligomer and monomer components can be those described above. In addition, this composition of the present invention can contain various polymerization initiators and/or additives as described above.

Another aspect of the present invention relates to an optical fiber prepared with a primary coating composition of the present invention. Referring to FIG. 1, the optical fiber 10 includes a glass core 12, a cladding layer 14 surrounding and adjacent to the glass core 12, a primary coating material 16 which adheres to the cladding layer 14, and one or more secondary (or outer) coating materials 18 surrounding and adjacent to the primary coating material 16.

Any conventional material can be used to form the glass core 12, such as those described in U.S. Pat. No. 4,486,212 to Berkey, which is hereby incorporated by reference. The core is typically a silica glass having a cylindrical cross section and a diameter ranging from about 5 to about 10 ″m for single-mode fibers and about 20 to about 100 ″m for multi-mode fibers. The core can optionally contain varying amounts of other material such as, e.g., oxides of titanium, thallium, germanium, and boron, which modify the core's refractive index. Other dopants which are known in the art can also be added to the glass core to modify its properties.

The cladding layer 14 preferably has a refractive index which is less than the refractive index of the core. A variety of cladding materials, both plastic and glass (e.g., silicate and borosilicate glasses) are used in constructing conventional glass fibers. Any conventional cladding materials known in the art can be used to form the cladding layer 14 in the optical fiber of the present invention.

The advantages of the primary coating composition of the present invention are due fundamentally to an interaction of the adhesion promoter (e.g., bis(trimethoxysilylethyl) benzene), with the monomer and oligomer components of the composition. While not wishing to be bound by theory, it is believed that the effectiveness of the adhesion promoter is primarily determined by its weak interaction with and/or solubility within the monomer and oligomer components. The use of the carrier in combination with adhesion promoter can further promote the effectiveness of the adhesion promoter.

The secondary coating material(s) 18 is typically the polymerization (i.e., cured) product of a coating composition that contains urethane acrylate liquids whose molecules become cross-linked when polymerized. Other suitable materials for use in secondary coating materials, as well as considerations related to selection of these materials, are well known in the art and are described in U.S. Pat. Nos. 4,962,992 and 5,104,433 to Chapin, which are hereby incorporated by reference. Various additives that enhance one or more properties of the coating can also be present, including the above-mentioned additives incorporated in the compositions of the present invention.

The secondary coating materials 18 can be a tight buffer coating or, alternatively, a loose tube coating. Irrespective of the type of secondary coating employed, it is preferred that the outer surface of the secondary coating material 18 not be tacky so that adjacent convolutions of the optic fiber (i.e., on a process spool) can be unwound.

The components of the optical fiber of the present invention can optionally include a coloring material, such as a pigment or dye, or an additional colored ink coating.

The optical fibers of the present invention can also be formed into a optical fiber ribbon which contains a plurality of substantially aligned, substantially coplanar optic fibers encapsulated by a matrix material. The matrix material can be made of a single layer or of a composite construction. Suitable matrix materials include polyvinyl chloride as well as those materials known to be useful as secondary coating materials. In one embodiment, the-matrix material can be the polymerization product of the composition used to form the secondary coating material.

Because of the advantages offered by use of the adhesion promoter alone or in combination with the carrier, it is possible to produce optical fibers capable of withstanding high humidity conditions (i.e., when immersed in water).

Another benefit of the optical fiber of the present invention is that it is capable, upon extended exposure to water, of exhibiting few micro-delaminations between the primary coating and the glass fiber, preferably fewer than 10 per decimeter of the optical fiber. More preferred optical fibers, which contain the primary coating prepared from the preferred compositions of the present invention, are capable of exhibiting no micro-delaminations following extended exposure to water. More specifically, preferred optical fibers are those which exhibit fewer than 10 and preferably no micro-delaminations upon exposure to water at about 20 to 65° C., for 7 days, preferably 14 days, more preferably 30 days or more. On the basis of their ability to endure extended exposure to water, it is believed that the optical fibers of the present invention can endure high humidity conditions for their intended lifetime (i.e., about 25 years or more).

Another aspect of the present invention relates to a method of making an optical fiber of the present invention. Basically, this method can be effected by standard methods with the use of a primary coating composition of the present invention.

Briefly, the process involves fabricating the glass fiber (core 12 and cladding layer 14), coating the glass fiber with the primary coating composition of the present invention, and polymerizing the composition to form the primary coating material 16. Optionally, a secondary coating composition can be applied to the coated fiber either before or after polymerizing the primary coating. When applied after polymerizing the primary coating, a second polymerization step must be employed.

The primary and optional secondary coating compositions are coated on a glass fiber using conventional processes.

It is well known to draw glass fibers from a specially prepared, cylindrical preform which has been locally and symmetrically heated to a temperature, e.g., of about 2000° C. As the preform is heated, such as by feeding the preform into and through a furnace, a glass fiber is drawn from the molten material. The primary and optional secondary coating compositions are applied to the glass fiber after it has been drawn from the preform, preferably immediately after cooling. The coating compositions are then cured to produce the coated optical fiber. The method of curing can be thermal, chemical, or radiation induced, such as by exposing the un-cured coating composition on the glass fiber to heat or ultraviolet light or electron beam, depending upon the nature of the coating composition(s) and polymerization initiator being employed. It is frequently advantageous to apply both the primary coating composition and any secondary coating compositions in sequence following the draw process. One method of applying dual layers of coating compositions to a moving glass fiber is disclosed in U.S. Pat. No. 4,474,830 to Taylor, which is hereby incorporated by reference. Another method for applying dual layers of coating compositions onto a glass fiber is disclosed in U.S. Pat. No. 4,581,165 to Rannell et al., which is hereby incorporated by reference. Of course, the primary coating composition can be applied and cured to form the primary coating material 16, then the secondary coating composition(s) can be applied and cured to form the secondary coating material 18.

Coated optical fibers 10 of the present invention can also be used to prepare an optical fiber ribbon using conventional methods of preparation. For example, a plurality of coated optical fibers 10 are substantially aligned in a substantially coplanar relationship to one another and, while remaining in this relationship, the coated optical fibers are coated with a composition that is later cured to form the ribbon matrix material. The composition used to prepare the ribbon matrix material can be the same as the secondary coating composition, or any other suitable composition known in the art. Methods of preparing optical fiber ribbons are described in U.S. Pat. Nos. 4,752,112 to Mayr and 5,486,378 to Oestreich et al., which are hereby incorporated by reference.

EXAMPLES

The following examples are provided to illustrate embodiments of the present invention, but they are by no means intended to limit its scope.

Example 1

Preparation of Coated Fibers

A number of primary coating compositions were prepared with the components listed in Table 1 below. The components were introduced into a heated kettle and blended together at a temperature within the range of from about 40° C. to 70° C., preferably between about 50° C. to 60° C. Blending was continued until the components were thoroughly mixed to yield a composition having a viscosity suitable for use in standard commercial coating operations, generally between about 50 to 150 poise at a temperature of about 25° C. or between about 5 to 15 poise at coating application temperature.

TABLE 1

Primary Coating Compositions

| | Oligomer (wt %) | Monomer (wt %) | Photoinitiator (wt %) | Antioxidant (pph) | Adhesion Promoter (pph) |
|---|---|---|---|---|---|
| A | CN986 74% | SR335 20% | Irgacure 184 6% | — | — |
| B | CN986 74% | SR335 20% | Irgacure 184 6% | — | 3-methacryloxypropyl trimethoxysilane 1.0 pph |
| C | CN986 74% | SR335 20% | Irgacure 184 6% | — | 3-acryloxypropyltrimethoxy silane 1.0 pph |
| D | CN986 74% | SR335 20% | Irgacure 184 6% | — | allyltrimethoxysilane 1.0 pph |
| E | CN986 74% | SR335 20% | Irgacure 184 6% | — | vinyltrimethoxysilane 1.0 pph |
| F | CN986 74% | SR335 20% | Irgacure 184 6% | — | 3-aminopropyltrimethoxy silane 1.0 pph |
| G | CN986 74% | SR335 20% | Irgacure 184 6% | — | phenethyltrimethoxysilane 1.0 pph |
| H | CN986 74% | SR335 20% | Irgacure 184 6% | — | 3-mercaptopropyltrimethoxy silane 1.0 pph |
| I | CN986 74% | SR335 20% | Irgacure 184 6% | — | bis(trimethoxysilylethyl) benzene 1.0 pph |
| J | BR3731 72% | SR335 25% | Irgacure 1850 3% | Irganox 1035 0.5 pph | bis(trimethoxysilylethyl) benzene 1.0 pph |
| K | BR3731 60% | SR335 35% | Irgacure 1850 3.5% | Irganox 1035 0.5 pph | bis(trimethoxysilylethyl) benzene |

TABLE 1-continued

Primary Coating Compositions

Components

| Oligomer (wt %) | Monomer (wt %) | Photoinitiator (wt %) | Antioxidant (pph) | Adhesion Promoter (pph) |
|---|---|---|---|---|
| | SR504 1.5% | | | 1.0 pph |
| L STC3-149 55% | SR504 42% | Irgacure 1850 3% | Irganox 1035 1.0 pph | bis(trimethoxysilylethyl) benzene 1.0 pph |

Of the oligomers listed in Table 1, CN986 is a polyether urethane acrylate oligomer available from Sartomer Company, Inc., BR3731 is a polyether urethane acrylate oligomer available from Bomar Specialty Co., and STC3-149 is a polyether urethane acrylate oligomer available from Bomar Specialty Co.

Of the monomers listed in Table 1, SR335 is a lauryl acrylate monomer available from Sartomer Company, Inc., and SR504 is a ethoxylatednonylphenol acrylate monomer also available from Sartomer Company, Inc.

Of the photoinitiators listed in Table 1, Irgacure 184 is a 1-hydroxycyclohexylphenyl ketone available from Ciba Specialty Chemical and Irgacure 1850 is a blend of 1-hydroxycyclohexylphenyl ketone and bis(2,6-dimethoxybenzoyl) -2,4,4-trimethylpentylphosphine oxide, also available from Ciba Specialty Chemical.

Of the antioxidants listed in Table 1, Irganox 1035 is a thiodiethylene bis(3,5-di-tert-butyl-4-hydroxyhydrocinnamate) available from Ciba Specialty Chemical.

Once the compositions were prepared, primary and secondary coating materials were applied to drawn glass fibers subsequent to cooling. The glass fiber, having a diameter of about 125 μm, was introduced into a container of one of the compositions listed in Table 1. As the coated fiber was removed from the container, the thickness of the primary coating composition was adjusted to about 32.5 μm by passing the coated fiber through a die. After application of the primary coating composition to the optical fiber, the primary coating is cured, after which the secondary coating is applied. The coated fiber was drawn through a second coating container holding a secondary coating composition. As the coated fiber was removed from the second chamber, the thickness of the secondary coating composition was adjusted to about 27.5 μm by passing the coated fiber through a die. The coated fiber was then cured with ultraviolet radiation at a dose level of about 0.25 to 1.0 J/cm² using a D bulb (available from Fusion UV Systems, Inc. (Gaithersburg, Md.)) to produce an optical fiber having a diameter of about 245±10 μm.

For purposes of clarity, fibers coated by composition A are hereinafter referred to as fiber A, fibers coated by composition B are hereinafter referred to as fiber B, and so on.

Fibers A–I each received a urethane acrylate secondary coating, available from DSM Desotech (Elgin, IL), and fibers J–L each received the same secondary coating containing the components listed below:

| | |
|---|---|
| SR344 | 16% |
| SR602 | 14% |
| SR9020 | 14% |
| BR571 | 22% |
| CN983 | 30% |
| Irgacure 1850 | 3% |
| Irgacure 651 | 1% |
| Irganox 1035 | 1 pph |

Of the components in the secondary coating composition, SR344 is a polyethylene glycol (400) diacrylate available from Sartomer Company, Inc., SR602 is an ethoxylated (10) bisphenol A diacrylate available from Sartomer Company, Inc., SR9020 is a propoxylated (3) glyceryl triacrylate available from Sartomer Company, Inc., BR571 is a polyether urethane acrylate oligomer available from Bomar Specialty Co., CN983 is a polyester urethane acrylate oligomer available from Sartomer Company, Inc., Irgacure 1850 is a blend of 1-hydroxycyclohexylphenyl ketone and bis(2,6-dimethoxybenzoyl)-2,4,4-trimethylpentylphosphine oxide available from Ciba Specialty Chemical, Irgacure 651 is a 2,2-dimethoxy-2-phenyl acetophenone available from Ciba Specialty Chemical, and Irganox 1035 is a thiodiethylene bis(3,5-di-tert-butyl-4-hydroxyhydrocinnamate) available from Ciba Specialty Chemical.

Example 2

Water Soak Evaluation of Fibers A–L for Delamination or Micro-delamination

Fibers A–L, after aging for about two to three weeks, were soaked in water at room temperature and at a temperature of about 65° C. for a duration of either 14 days, 30 days, or 60 days. The length of tested fiber must be sufficiently long to allow the ends of the fiber to remain above the water surface while soaking, which limits any effect of the water to radial penetration (i.e. no penetration at the end of the fiber) of the coating(s). Following the pre-determined soaking time, each sample was examined by microscopic analysis at 100× magnification of 10 cm sections of the optical fiber for the presence of delamination sites (i.e., large areas of separation between the primary coating and the glass fiber) or sites of micro-delamination ("MD"). The MD sites are relatively small delamination sites which have a maximum size of about 1 mm. The frequency and the size of the MD are counted and reported as the number of MD and the largest size (in mm) in the 10 cm section examined. If a sample fiber displayed delamination at a particular temperature, subsequent examinations (e.g., 30 day or 60 day) were often not performed. The results of the examination are shown in Table 2 below.

TABLE 2

Results of Soak Test for Fibers A–L

| | Room Temperature Soak | | | 65° C. Soak | | |
|---|---|---|---|---|---|---|
| | 14 day | 30 day | 60 day | 14 day | 30 day | 60 day |
| A | delam. | — | — | delam. | — | — |
| B | few delam. | delam. | delam. | delam. | — | — |
| C | no MD | 105 MD (0.01 mm) | numerous MD | numerous MD with delam. | — | — |
| D | numerous MD | numerous MD | numerous MD | delam. | — | — |
| E | delam. | — | — | delam. | — | — |
| F | numerous MD with delam. | — | — | delam. | — | — |
| G | delam. | delam. | — | delam. | Delam. | — |
| H | no MD | no MD | — | few MD (0.05 mm) | Few MD (0.04 mm) | — |
| I | no MD | no MD | no MD | few MD (0.07 mm) | — | — |
| J | 2 MD (0.12 mm) | 2 MD (0.11 mm) | 5 MD (0.14 mm) | no MD | No MD | no MD |
| K | no MD | no MD | no MD | no MD | No MD | no MD |
| L | 10 MD (0.05 mm) | 2 MD (0.05 mm) | 1 MD (0.04 mm) | no MD | No MD | no MD |

In some instances the size of the MD were measured, in which case the size of the largest MD present is listed in parenthesis.

Fiber A, having a primary coating with no adhesion promoter, displayed significant delamination following the 14-day soak at room temperature and elevated temperature. Fiber A served as a control.

In comparing fibers B–I, which contained the same primary coating formulation except for the particular adhesion promoter, it is apparent that fibers C, D, H, and I were the only optical fibers that did not suffer from delamination at room temperature and elevated temperature. Of these, fibers C and D exhibited numerous MD and/or delamination at higher temperatures, while fibers H and I displayed no MD whatsoever at room temperature and few MD at higher temperatures. Thus, it is apparent that the two adhesion promoters least affected by high temperature and water, when used in the described coating system, are 3-mercaptopropyltrimethoxysilane (fiber H) and bis(trimethoxysilylethyl)benzene (fiber I).

Fibers I–L, which had different primary coating formulations that each contained the adhesion promoter bis(trimethoxysilylethyl)benzene, generally fared much better at room temperature and at elevated temperature soaks than fibers A–H. None of the fibers I–L displayed signs of delamination. Fiber K outperformed all other fibers, displaying no MD following room temperature and elevated temperature soaks. Fiber I performed well, displaying no MD following room temperature soaks and few MD following the 14 day elevated temperature soak. Surprisingly, fibers J and L displayed no MD following elevated temperature soaks, but several MD following room temperature soaks.

Example 3

Strip Force Test of Soaked Fibers

A strip force test was performed according to FOTP-178 (which is hereby incorporated by reference), whereby coated fibers are placed into a load cell and then stripped at a specified rate under specified environmental conditions. To be commercially useful, the measured strip force must fall between about 0.2 and 2.0 pounds force (0.89 and 8.9 Newtons). The strip force test was applied to dry and wet fibers. Wet fibers were soaked in water for 14 days at room temperature prior to conducting the strip force test. The results of the strip force test are shown in Table 3 below.

TABLE 3

Strip Force Test Measurements

| | Dry SF (lb) | SF (Newton) | Confidence (Newton) | Wet SF (lb) | SF (Newton) | Confidence (Newton) |
|---|---|---|---|---|---|---|
| A | 0.84 | 3.74 | 0.12 | 0.53 | 0.24 | 1.07 | 0.03 | 0.13 |
| B | 0.99 | 4.40 | 0.23 | 1.02 | 0.63 | 2.80 | 0.09 | 0.40 |
| C | 0.95 | 4.23 | 0.16 | 0.71 | 0.78 | 3.47 | 0.13 | 0.58 |
| D | 1.21 | 5.38 | 0.13 | 0.58 | 0.63 | 2.80 | 0.09 | 0.40 |
| E | 1.18 | 5.25 | 0.2 | 0.89 | 0.33 | 1.47 | 0.08 | 0.36 |
| F | 1.14 | 5.07 | 0.1 | 0.44 | 0.50 | 2.22 | 0.14 | 0.62 |
| G | 0.94 | 4.18 | 0.18 | 0.80 | 0.28 | 1.25 | 0.01 | 0.04 |
| H | 0.83 | 3.69 | 0.14 | 0.62 | 0.86 | 3.83 | 0.14 | 0.62 |
| I | 0.75 | 3.34 | 0.07 | 0.31 | 0.68 | 3.03 | 0.05 | 0.22 |
| J | 0.55 | 2.45 | 0.08 | 0.36 | 0.41 | 1.82 | 0.05 | 0.22 |
| K | 1.01 | 4.49 | 0.08 | 0.36 | 0.48 | 2.14 | 0.05 | 0.22 |
| L | 0.78 | 3.47 | 0.13 | 0.58 | 0.52 | 2.31 | 0.08 | 0.36 |

All of the compositions exhibited suitable strip force when dry and when wet, satisfying the Bellcore specification. In comparing Fibers B–I, which contained the same primary coating formulation except for the particular adhesion promoter, it is apparent that the two adhesion promoters least affected by water are 3-mercaptopropyltrimethoxysilane (Fiber H) and bis(trimethoxysilylethyl)benzene (Fiber I). Fibers E and G exhibited a dry/wet reduction in strip force which was comparable to Fiber A (control). Thus, vinyltrimethoxysilane and phenethyltrimethoxysilane are not likely to be suitable adhesion promoters under high moisture conditions. In comparing Fibers I–L, which had different primary coating formulations but each contained the adhesion promoter bis(trimethoxysilylethyl)benzene, Fiber I displayed the least dry/wet reduction in strip force and all of the fibers performed better than Fiber A (control). Differences in performance for Fibers I–L are attributable to the different formulations (i.e., oligomer/monomer selections) and the interaction of the other components with the bis(trimethoxysilylethyl)benzene.

Example 4

Formulations Containing Adhesion Promoters With or Without a Carrier

A number of primary coating compositions were prepared with the components listed in Table 4 below. The components were introduced into a heated kettle and blended together. Blending was performed at a temperature within the range of about 40° C. to 70° C., preferably about 50° C. to 60° C. Blending was continued until the components were thoroughly mixed to yield a composition having a viscosity suitable for use in standard commercial coating operations, generally between about 50 to 150 poise at a temperature of about 25° C. or between about 5 to 15 poise at coating application temperature.

TABLE 4

Primary Coating Compositions

| | Oligomer (wt %) | Monomer (wt %) | Photoinitiator (wt %) | Antioxidant (pph) | Adhesion Promoter (pph) | Carrier (pph) |
|---|---|---|---|---|---|---|
| M | BR3731 52% | SR504 45% | Irgacure 1850 3% | Irganox 1035 1.0 pph | bis(trimethoxy-silylethyl)benzene 1.0 pph | — |
| N | BR3731 52% | SR504 45% | Irgacure 1850 3% | Irganox 1035 1.0 pph | bis(trimethoxy-silylethyl)benzene 1.0 pph | Tegorad 2200 0.5 pph |
| O | BR3731 52% | SR504 45% | Irgacure 1850 3% | Irganox 1035 1.0 pph | bis(trimethoxysilyl) hexane 1.0 pph | — |
| P | BR3731 52% | SR504 45% | Irgacure 1850 3% | Irganox 1035 1.0 pph | bis(trimethoxysilyl) hexane 1.0 pph | Tegorad 2200 0.5 pph |
| Q | BR3731 52% | SR504 45% | Irgacure 1850 3% | Irganox 1035 1.0 pph | 3-methacryloxypropyl-trimethoxysilane 1.0 pph | — |
| R | BR3731 52% | SR504 45% | Irgacure 1850 3% | Irganox 1035 1.0 pph | 3-methacryloxypropyl-trimethoxysilane 1.0 pph | Tegorad 2200 0.5 pph |
| S | BR3731 52% | SR504 45% | Irgacure 1850 3% | Irganox 1035 1.0 pph | 3-mercaptopropyl-trimethoxysilane 1.0 pph | — |
| T | BR3731 52% | SR504 45% | Irgacure 1850 3% | Irganox 1035 1.0 pph | 3-mercaptopropyl-trimethoxysilane 1.0 pph | Tegorad 2200 0.5 pph |

All components listed in Table 4 are identified in Example 1 except Tegorad 2200, which is an acrylated polyalkoxy-polysiloxane available from Goldschmidt Chemical Co.

Once the compositions were prepared, primary and secondary coating materials were applied to drawn glass fibers subsequent to cooling. The glass fiber, having a diameter of about 125 μm, was introduced into a container of one of the compositions listed in Table 4. As the coated fiber was removed from the container, the thickness of the primary coating composition was adjusted to about 32.5 μm by passing the coated fiber through a die. After application of the primary coating composition to the optical fiber, the primary coating is cured, after which the secondary coating is applied onto the cured primary coating. The coated fiber was drawn through a second coating container of a secondary coating composition. As the coated fiber was removed from the second container, the thickness of the secondary coating composition was adjusted to about 27.5 μm by passing the coated fiber through a die. The coated fiber was then cured with ultraviolet radiation at a dose level of about 0.25 to 1.0 J/cm$^2$ using a D bulb (available from Fusion UV Systems Inc.) to produce an optical fiber having a diameter of between about 245 μm ±10 μm.

For purposes of clarity, fibers coated by composition M are hereinafter referred to as fiber M, fibers coated by composition N are hereinafter referred to as fiber N, and so on.

Fibers M–T each received the same secondary coating as described in Example 1.

Example 5

Water Soak Evaluation of Fibers M–T for Delamination or Micro-delamination

Samples were obtained from fibers M–T after they were aged about two to three weeks. The samples from fibers M–T were soaked in water at room temperature and at a temperature of about 65° C. for a duration of either 14 days, 30 days, or 60 days. The length of tested fiber must be sufficiently long to allow the ends of the fiber to remain above the water surface while soaking, which limits any effect of the water to radial penetration of the coating(s). Following the pre-determined soaking time, each 10 cm long sample was examined by microscopic analysis at 100×magnification for the presence of delamination or MD sites as described in Example 2. The results of the examination are shown in Table 5 below.

TABLE 5

Results of Soak Test for Fibers M–T

| | Room Temperature Soak | | | 65° C. Soak | | |
|---|---|---|---|---|---|---|
| | 14 day | 30 day | 60 day | 14 day | 30 day | 60 day |
| M | 4100 MD | 4100 MD | 5500 MD | 2 MD (0.44 mm) | no MD | 1 MD (0.040 mm) |
| N | no MD | no MD | no MD | no MD | no MD | No MD |
| O | 5 MD (0.10 mm) | 1 MD (0.13 mm) | — | no MD | no MD | — |
| P | 5 MD (0.08 mm) | 2 MD (0.06 mm) | — | no MD | 1 MD (0.02 mm) | — |
| Q | no MD | no MD | — | no MD | no MD | — |
| R | few delam. | few delam. | — | 140 MD (0.04 mm) | 152 MD (0.06 mm) | — |
| S | no MD | no MD | no MD | no MD | no MD | no MD |
| T | 19 delam. | 26 delam. | 29 delam. | 4 MD (0.03 mm) | no MD | 274 delam. |

Fiber M, which has a primary coating that contains bis(trimethoxysilylethyl)benzene without Tegorad 2200, displayed extensive MD over periods of time as short as two weeks. However, when this adhesion promoter and carrier are used together as in fiber N, no MD were observed at room or elevated temperature. Fibers O and P, which contained bis(trimethoxysilyl)hexane with and without Tegorad 2200, respectively, showed no added benefit of the Tegorad 2200.

In sharp contrast to these results, fibers Q–T, which contained the conventional adhesion promoters 3-methacryloxypropyltrimethoxysilane or 3-mercaptopropyltrimethoxysilane, exhibited increased MD when the carrier Tegorad 2200 was added to the primary coating material.

Although the invention has been described in detail for the purpose of illustration, it is understood that such detail is solely for that purpose, and variations can be made therein by those skilled in the art without departing from the spirit and scope of the invention which is defined by the following claims. For example, the adhesion promoters with or without carrier systems, could be employed in unitary layer coating systems for optical fibers, rather than the coating systems which employ both a primary and secondary coating.

What is claimed:

1. A composition useful for coating optical fibers comprising:
    an oligomer capable of being polymerized;
    a monomer suitable to control the viscosity of said composition; and
    an adhesion promoter comprising a compound containing a cyclic structure interposed between at least two reactive silanes independently selected from the group consisting of alkoxysilanes and halosilanes.

2. The composition according to claim 1, wherein said cyclic structure is a hydrocarbon cyclic structure or a heterocyclic structure.

3. The composition according to claim 2, wherein said cyclic structure is a hydrocarbon cyclic structure, said hydrocarbon cyclic structure being an aromatic ring or a substituted aromatic ring.

4. The composition according to claim 1, wherein said at least two reactive silanes are independently a dialkoxysilane, a trialkoxysilane, or a trihalosilane.

5. The composition according to claim 1, wherein said compound is selected from a group consisting of a bis(trimethoxysilylethyl)benzene and bis(triethoxysilylethyl)benzene.

6. The composition according to claim 1, wherein said adhesion promoter is present in the composition in an amount of about 0.1 to 10 percent by weight.

7. The composition according to claim 1, wherein said oligomer is an ethylenically unsaturated oligomer present in the composition in an amount of about 10 to 90 percent by weight.

8. The composition according to claim 7, wherein said ethylenically unsaturated oligomer is selected from a group consisting of a polyether urethane acrylate oligomer, polyester urethane acrylate oligomer, polyurea urethane acrylate oligomer, polyether acrylate oligomer, polyester acrylate oligomer, polyurea acrylate oligomer, epoxy acrylate oligomer, hydrogenated polybutadiene oligomer, acrylate oligomers based on tris(hydroxyethyl)isocyanurate, (meth) acrylated acrylic oligomers and combinations thereof.

9. The composition according to claim 1, wherein said monomer is an ethylenically unsaturated monomer present in the composition in an amount of about 10 to 90 percent by weight.

10. The composition according to claim 9, wherein said ethylenically unsaturated monomer is selected from a group consisting of lauryl acrylate, ethoxylatednonylphenol acrylate, caprolactone acrylate, phenoxyethyl acrylate, isooctyl acrylate, tridecyl acrylate, phenoxyglycidyl acrylate, lauryloxyglycidyl acrylate, isobornyl acrylate, tetrahydrofurfiuryl acrylate, stearyl acrylate, isodecyl acrylate, 2-(2-ethoxyethoxy)ethyl acrylate, and combinations thereof.

11. The composition according to claim 1 further comprising: a polymerization initiator.

12. The composition according to claim 1 further comprising:
    an additive selected from a group consisting of a stabilizer, anti-oxidant, catalyst, co-monomer, lubricant, low molecular weight non-crosslinking resin, and combinations thereof.

13. A composition comprising:
    an oligomer capable of being polymerized;
    a monomer suitable to control the viscosity of said composition;
    an adhesion promoter comprising a compound containing at least two reactive silane and at least one organo functional group bonded to at least one of the silanes; and
    a carrier.

14. The composition according to claim 13, wherein said carrier is a reactive surfactant.

15. The composition according to claim 14, wherein said reactive surfactant is a polyalkoxypolysiloxane.

16. The composition according to claim 13, wherein said carrier is present in said composition in an amount between about 0.01 to 5 parts per hundred.

17. The composition according to claim 13, wherein said compound contains a cyclic structure interposed between at least two reactive silanes, said cyclic structure being a hydrocarbon cyclic structure or a heterocyclic structure.

18. The composition according to claim 17, wherein said cyclic structure contains a hydrocarbon cyclic structure, said hydrocarbon cyclic structure being an aromatic ring or a substituted aromatic ring.

19. The composition according to claim 13, wherein said compound contains a cyclic structure interposed between at least two reactive silanes and said compound further contains:
    a substituent interposed between said cyclic structure and at least one of the at least two reactive silanes.

20. The composition according to claim 19, wherein said substituent is selected from a group consisting of an alkylene group, hetero group, hetero-alkylene group, oxygen, nitrogen, sulfur, phosphorous, selenium, titanium, zirconium, and silicon.

21. The composition according to claim 13, wherein said at least two reactive silanes are independently a dialkoxysilane, a trialkoxysilane, or a trihalosilane.

22. The composition according to claim 13, wherein said compound is selected from a group consisting of a bis(trimethoxysilylethyl)benzene and bis(triethoxysilylethyl)benzene.

23. The composition according to claim 13, wherein said adhesion promoter is present in the composition in an amount of about 0.1 to 10 percent by weight.

24. The composition according to claim 13, wherein said oligomer is an ethylenically unsaturated acrylate oligomer present in the composition in an amount of about 10 to 90 percent by weight.

25. The composition according to claim 24, wherein said ethylenically unsaturated oligomer is selected from a group consisting of a polyether urethane acrylate oligomer, polyester urethane acrylate oligomer, polyurea urethane acrylate oligomer, polyether acrylate oligomer, polyester acrylate oligomer, polyurea acrylate oligomer, epoxy acrylate oligomer, hydrogenated polybutadiene oligomer, acrylate oligomers based on tris(hydroxyethyl)isocyanurate, (meth)acrylated acrylic oligomers and combinations thereof.

26. The composition according to claim 13, wherein said monomer is an ethylenically unsaturated monomer present in the composition in an amount of about 10 to 90 percent by weight.

27. The composition according to claim 26, wherein said ethylenically unsaturated monomer is selected from a group consisting of lauryl acrylate, ethoxylatednonylphenol acrylate, caprolactone acrylate, phenoxyethyl acrylate, isooctyl acrylate, tridecyl acrylate, phenoxyglycidyl acrylate, lauryloxyglycidyl acrylate, isobomyl acrylate, tetrahydrofurfuryl acrylate, stearyl acrylate, isodecyl acrylate, 2-(2-ethoxyethoxy)ethyl acrylate, and combinations thereof.

28. The composition according to claim 13 further comprising: a polymerization initiator.

29. The composition according to claim 17 further comprising: an additive selected from a group consisting of a stabilizer, anti-oxidant, catalyst, co-monomer, lubricant, low molecular weight non-crosslinking resin, and combinations thereof.

30. An optical fiber comprising:
a glass fiber and
a primary coating encapsulating said glass fiber, said primary coating being the cured product of a polymerizable composition comprising an adhesion promoter including a compound containing a cyclic structure interposed between at least two reactive silanes independently selected from the group consisting of alkoxysilanes and halosilanes.

31. The optical fiber according to claim 30, wherein said optical fiber, upon extended exposure to water at between about 20 to 65° C., exhibits fewer than 10 micro-delaminations between said primary coating and said glass fiber, per decimeter of said optical fiber.

32. The optical fiber according to claim 31, wherein said optical fiber exhibits no micro-delaminations between said primary coating and said glass fiber, per decimeter of said optical fiber.

33. The optical fiber according to claim 30, wherein said compound is selected from a group consisting of a bis(trimethoxysilylethyl)benzene and bis(triethoxysilylethyl)benzene.

34. The optical fiber according to claim 30, wherein said adhesion promoter is present in said polymerizable composition in an amount of about 0.1 to 10 percent by weight.

35. The optical fiber according to claim 30, wherein said polymerizable composition further comprises:
an ethylenically unsaturated oligomer capable of polymerization and
an ethylenically unsaturated monomer suitable to control the viscosity of said composition.

36. The optical fiber according to claim 35, wherein said ethylenically unsaturated oligomer is selected from a group consisting of a polyether urethane acrylate oligomer, polyester urethane acrylate oligomer, polyurea urethane acrylate oligomer, polyether acrylate oligomer, polyester acrylate oligomer, polyurea acrylate oligomer, epoxy acrylate oligomer, hydrogenated polybutadiene oligomer, acrylate oligomers based on tris(hydroxyethyl)isocyanurate, (meth)acrylated acrylic oligomers and combinations thereof.

37. The optical fiber according to claim 35, wherein said ethylenically unsaturated monomer is selected from a group consisting of lauryl acrylate, ethoxylatednonylphenol acrylate, caprolactone acrylate, phenoxyethyl acrylate, isooctyl acrylate, tridecyl acrylate, phenoxyglycidyl acrylate, lauryloxyglycidyl acrylate, isobomyl acrylate, tetrahydrofurfulryl acrylate, stearyl acrylate, isodecyl acrylate, 2-(2-ethoxyethoxy)ethyl acrylate, and combinations thereof.

38. An optical fiber comprising:
a glass fiber and
a primary coating encapsulating said glass fiber, said primary coating being the cured product of a polymerizable composition comprising:
a carrier and
an adhesion promoter including a compound containing more than one reactive silane and at least one organo functional group bonded to at least one of the silanes.

39. The optical fiber according to claim 38, wherein said optical fiber, upon extended exposure to water at between about 20 to 65° C., exhibits fewer than 10 micro-delaminations between said primary coating and said glass fiber, per decimeter of said optical fiber.

40. The optical fiber according to claim 39, wherein said optical fiber exhibits no micro-delaminations between said primary coating and said glass fiber, per decimeter of said optical fiber.

41. The optical fiber according to claim 38, wherein said compound is selected from a group consisting of a bis(trimethoxysilylethyl)benzene and bis(triethoxysilylethyl)benzene.

42. The optical fiber according to claim 38, wherein said carrier is a reactive surfactant.

43. The optical fiber according to claim 42, wherein said reactive surfactant is a polyalkoxypolysiloxane.

44. The optical fiber according to claim 38, wherein said polymerizable composition further comprises:
an ethylenically unsaturated oligomer capable of polymerization and
an ethylenically unsaturated monomer suitable to control the viscosity of said composition.

45. The optical fiber according to claim 44, wherein said ethylenically unsaturated oligomer is selected from a group consisting of a polyether urethane acrylate oligomer, polyester urethane acrylate oligomer, polyurea urethane acrylate oligomer, polyether acrylate oligomer, polyester acrylate oligomer, polyurea acrylate oligomer, epoxy acrylate oligomer, hydrogenated polybutadiene oligomer, acrylate oligomers based on tris(hydroxyethyl)isocyanurate, (meth)acrylated acrylic oligomers and combinations thereof.

46. The optical fiber according to claim 44, wherein said ethylenically unsaturated monomer is selected from a group consisting of lauryl acrylate, ethoxylatednonylphenol acrylate, caprolactone acrylate, phenoxyethyl acrylate, isooctyl acrylate, tridecyl acrylate, phenoxyglycidyl acrylate, lauryloxyglicidyl acrylate, isobomyl acrylate, tetrahydrofurfuryl acrylate, stearyl acrylate, isodecyl acrylate, 2-(2-ethoxyethoxy)ethyl acrylate, acrylate oligomers based on tris(hydroxyethyl)isocyanurate, (meth)acrylated acrylic oligomers and combinations thereof.

47. A method of making an optical fiber comprising:
providing a glass fiber;
coating the glass fiber with a primary polymerizable composition comprising an adhesion promoter including a compound containing a cyclic structure interposed between at least two reactive silanes independently selected from the group consisting of alkoxysilanes and halosilanes; and
polymerizing the composition under conditions effective to form a primary coating over the glass fiber.

48. The method according to claim 47, wherein one or both of the primary and secondary polymerizable compositions are photopolymerizable.

49. The method according to claim 47, wherein said coating the glass fiber with a secondary polymerizable composition is carried out prior to said polymerizing, whereby said polymerizing simultaneously polymerizes the primary polymerizable composition and the secondary polymerizable composition.

50. The method according to claim 47, wherein said coating the glass fiber with a secondary polymerizable composition is carried out after said polymerizing and further comprises:
polymerizing the secondary polymerizable composition after it is applied to the glass fiber.

51. The method according to claim 47, wherein the compound is selected from a group consisting of a bis (trimethoxysilylethyl)benzene and bis(triethoxysilylethyl) benzene.

52. The method according to claim 47, wherein the primary polymerizable composition further comprises:
an ethylenically unsaturated oligomer capable of polymerization and
an ethylenically unsaturated monomer suitable to control the viscosity of the primary polymerizable composition.

53. A method of making an optical fiber comprising:
providing a glass fiber;
coating the glass fiber with a primary polymerizable composition comprising:
a carrier and
an adhesion promoter including a compound containing more than one reactive silane and at least one organo functional group bonded to at least one of the reactive silanes; and
polymerizing the composition under conditions effective to form a primary coating over the glass fiber.

54. The method according to claim 53 further comprising:
coating the glass fiber with a secondary polymerizable composition over the primary polymerizable composition or the primary coating.

55. The method according to claim 54, wherein one or both of the primary and secondary polymerizable compositions are photopolymerizable.

56. The method according to claim 54, wherein said coating the glass fiber with a secondary polymerizable composition is carried out prior to said polymerizing, whereby said polymerizing simultaneously polymerizes the primary polymerizable composition and the secondary polymerizable composition.

57. The method according to claim 54, wherein said coating the glass fiber with a secondary polymerizable composition is carried out after said polymerizing and further comprises:
polymerizing the secondary polymerizable composition after it is applied to the glass fiber.

58. The method according to claim 53, wherein the compound is selected from a group consisting of a bis (trimethoxysilylethyl)benzene and bis(triethoxysilylethyl) benzene.

59. The method according to claim 53, wherein the carrier is a reactive surfactant.

60. The method according to claim 59, wherein the reactive surfactant is a polyalkoxypolysiloxane.

61. The method according to claim 53, wherein the primary polymerizable composition further comprises:
an ethylenically unsaturated oligomer capable of polymerization and
an ethylenically unsaturated monomer suitable to control the viscosity of the primary polymerizable composition.

62. The composition according to claim 13 wherein said oligomer comprises an acrylate.

63. The composition according to claim 13 wherein said oligomer comprises an ethylenically unsaturated oligomer.

64. The composition according to claim 13 wherein the composition comprises an optical fiber coating composition.

65. The composition according to claim 1, wherein said compound further comprises a substituent interposed between the cyclic structure and at least one of the at least two reactive silanes.

66. The composition according to claim 65 said substituent selected from a group consisting of an alkylene group, hetero group, hetero-alkylene group, oxygen, nitrogen, sulfur, phosphorous, selenium, titanium, zirconium, and silicon.

67. The composition according to claim 13 wherein said compound contains a cyclic, straight-chain, or branched-chain structure interposed between said at least two reactive silanes independently selected from the group consisting of alkoxysilanes and halosilanes.

68. The method according to claim 47 further comprising coating the glass fiber with a secondary polymerizable composition over the primary polymerizable composition or the primary coating.

* * * * *